United States Patent
Li et al.

(10) Patent No.: US 9,756,069 B1
(45) Date of Patent: Sep. 5, 2017

(54) INSTANT RAW SCAN ON HOST PC WITH VIRTUALIZATION TECHNOLOGY

(71) Applicants: Yuefeng Li, Nanjiang (CN); Qiang Huang, Nanjing (CN); Hu Cao, Nanjing (CN)

(72) Inventors: Yuefeng Li, Nanjiang (CN); Qiang Huang, Nanjing (CN); Hu Cao, Nanjing (CN)

(73) Assignee: TREND MICRO INC., Tokyo (JP)

( * ) Notice: Subject to any disclaimer, the term of this patent is extended or adjusted under 35 U.S.C. 154(b) by 41 days.

(21) Appl. No.: 14/152,944

(22) Filed: Jan. 10, 2014

(51) Int. Cl.
*G06F 21/56* (2013.01)
*H04L 29/06* (2006.01)

(52) U.S. Cl.
CPC .................. *H04L 63/145* (2013.01)

(58) Field of Classification Search
CPC ..... H04L 63/145; G06F 21/53; G06F 21/566; G06F 21/568; G06F 21/575
USPC ............................................. 726/23, 24, 25
See application file for complete search history.

(56) References Cited

U.S. PATENT DOCUMENTS

| | | | | |
|---|---|---|---|---|
| 2006/0136720 | A1* | 6/2006 | Armstrong et al. | 713/164 |
| 2008/0184373 | A1* | 7/2008 | Traut | G06F 9/45533 726/26 |
| 2008/0320594 | A1* | 12/2008 | Jiang | G06F 21/566 726/24 |
| 2012/0179916 | A1* | 7/2012 | Staker | G06F 21/53 713/189 |
| 2013/0117848 | A1* | 5/2013 | Golshan et al. | 726/23 |
| 2015/0178497 | A1* | 6/2015 | Lukacs | G06F 9/461 726/23 |

* cited by examiner

*Primary Examiner* — Noura Zoubair
(74) *Attorney, Agent, or Firm* — Beyer Law Group LLP (57) ABSTRACT

A virtual machine is used to perform a raw scan for evasive malware on a host computer without requiring an interrupt or restart of a host operating system. An antivirus program installs a raw scanner virtual machine. The raw scanner virtual machine is triggered to scan files and memory for malware. The raw scan results are collected by the antivirus program for analysis, such as for use in generating a report or for removal of malware. The memory and files of the host are mapped to a guest space of the virtual machine.

2 Claims, 7 Drawing Sheets

FIG. 1
Detection System

FIG. 2
Detection System

FIG. 3
Operating Example

INSTANT RAW SCAN ON HOST PC WITH VIRTUALIZATION TECHNOLOGY

FIELD OF THE INVENTION

The present invention relates generally to detection of malware on a computer. More specifically, the present invention utilizes virtualization technology to detect malware that uses anti-access technology.

BACKGROUND OF THE INVENTION

Attacks upon computer systems are increasingly becoming more sophisticated and targeted. One particular type of threat is that of malware armed with hidden anti-access technology. The anti-access technology prevents the malicious code of the malware from being detected.

A Rootkit is an example of a stealthy type of malware. A Rootkit is designed to hide the existence of certain programs from normal methods of detection. Rootkit detection is very difficult precisely because of a Rootkit's ability to hide from antivirus programs. The Rootkit injects itself between the computer's hardware and OS, subtly altering data sent back and forth to mask its presence and take over the system. In particular, the Rootkit subverts the Master Boot Record (MBR). The MBR is a region of the hard drive that tells the BIOS (Basic Input Output System) where to find the OS (Operating System).

Traditional methods used in the scanning and detection processes of antivirus products face difficulties with a Rootkit because in many cases the methods used by the antivirus products can be easily avoided and hijacked by advanced malware. Additionally, even if a conventional antivirus product can handle a Rootkit, it typically requires interrupting user activity and initiating a forced Operating System (OS) reboot.

Traditional methods for performing a memory and file scan have problems dealing with advanced malware that includes anti-access technology. One prior art method is using a kernel driver. In this approach, the scan engine of a traditional antivirus product implements its memory and file scan in kernel mode in the form of a kernel driver. It utilizes the current OS native API no matter whether in File System level or port driver/mini-port driver for storage device level (such as Small Computer System Interface (SCSI), Attachment Packet Interface (Atapi), and so forth). However, advanced malware can also gain control in kernel mode and hijack the execution path of native code. As a consequence, the antivirus scan engine can be fooled by this type of advanced malware. For example, the TDL4 Rootkit (TDL-4 is a fourth generation botnet) will infect the MBR or third-party driver to gain a ring0privilege in order to hijack the Atapi port driver major function and return faked information for a normal file read. Additionally, the scan engine could be at the wrong level to deal with the malware. For example, the scan engine could be mixed with malware at the same level. Even worse, the scan engine often cannot be implemented at a low a level within the OS due to a capability and robustness considerations. However, malware can do this and be optimized for a specific target. In this way, the scan engine can be fought by the malware.

Another traditional method for memory and file scan is to use a second OS mechanism to detect malware, such as to detect malware infecting the boot component of the Host OS. An advantage is that the scan engine cannot be interrupted by any malicious code, permitting a thorough detection. However, a problem with this approach is that the current activity on the Host OS must be interrupted and stopped to reboot to the second OS. For example, the second OS is typically implemented using an additional USB stick as part of the fix. This requires the end user to insert and use a Universal Serial Bus (USB) fix, which include components for implementing a second OS on a USB stick. Additionally, the USB fix requires an interrupt and reboot that is annoying and unacceptable for most end users.

Accordingly, new techniques are desirable that can detect malware with anti-access technology in a manner that is transparent to the host OS.

SUMMARY OF THE INVENTION

To achieve the foregoing, and in accordance with the purpose of the present invention, a detection system and associated techniques are disclosed that can install a virtual machine to perform a raw scan. Files and memory are remapped to the guest space of the virtual machine, from which the virtual machine performs a raw scan for malware. The virtual machine is immune to common forms of evasive malware that includes anti-access technology preventing the malicious code of the malware from being detected using conventional antivirus programs. Consequently, the virtual machine can perform a raw scan of the host files and memory resources of a computer system to detect malware that includes anti-access technology, such as a Rootkit. Since the virtual machine is implemented as a host application, no interrupt or restart of the host operating system is required to perform a scan for evasive malware.

In one embodiment of a method, a virtual machine is installed as a host application on a host operating system of a computer. The virtual machine includes a malware scanner. The virtual machine performs a scan of files and memory of the computer for malicious software. The scan results are collected from the virtual machine.

In another embodiment of a method, a virtual machine is installed as a host application on a host operating system of a computer. The virtual machine includes a malware scanner having a memory scanner and a file scanner. The memory and files of the computer system are mapped to a guest space of the virtual machine. The virtual machine performs a scan of files and memory from the guest space of the virtual machine. The scan results are then provided to an antivirus program.

In yet another embodiment of a method, a virtual machine is installed as a host application on a host operating system of a computer by an antivirus program. The virtual machine is triggered to perform a scan for malware. The virtual machine includes a malware scanner having a memory scanner and a file scanner to scan the computer for malicious software from a guest space of the virtual machine. The antivirus program receives scan results from the virtual machine and the antivirus program uninstalls the virtual machine.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is based upon the recognition of the inventors that Virtualization Technology (VT) offers new capabilities for malware detection, particularly in regards to evasive malware. The development of chips that support virtualization technology permits the OS to gain more power to separate I/O access and memory access within the scope of the OS.

VT utilizes virtual machines. A virtual machine is typically installed on top of the original operating system of a computer. Virtual machines are separated into two major types based on their use. First, a system virtual machine may provide a complete system platform for the execution of a complete operating system. Second, a process virtual machine may be designed to run a single process. A process VM is also sometimes called an application virtual machine and runs as a normal application inside a host OS. One characteristic of a virtual machine is that the software running inside it is limited to those resources and abstractions defined by the virtual machine such that the program cannot break out of its virtual environment.

Virtualization technology also includes a virtualization platform, also known as a hypervisor, which executes about a computer processor such as x86, x86-64, Itanium, Power PC, ARM or other. The hypervisor is a piece of computer software, firmware, or hardware that creates and runs virtual machines. The virtualization platform may run directly on hardware and becomes the interface for hardware requests such as CPU, I/O, and disk for the various operating systems executing upon it. Each virtual machine is a guest machine. By separating the guest operating systems from the computer hardware, the hypervisor is able to run multiple operating systems securely and independently. An example of a hypervisor is the Xen hypervisor available from Citrix Systems, Inc. Another example of virtualization platforms are the ESXI and vSphere hypervisors available from VMware, the Hyper V Server hypervisor available from Microsoft Corporation, and the KVM hypervisor available from Linux.

Block Diagrams

Figure 1:
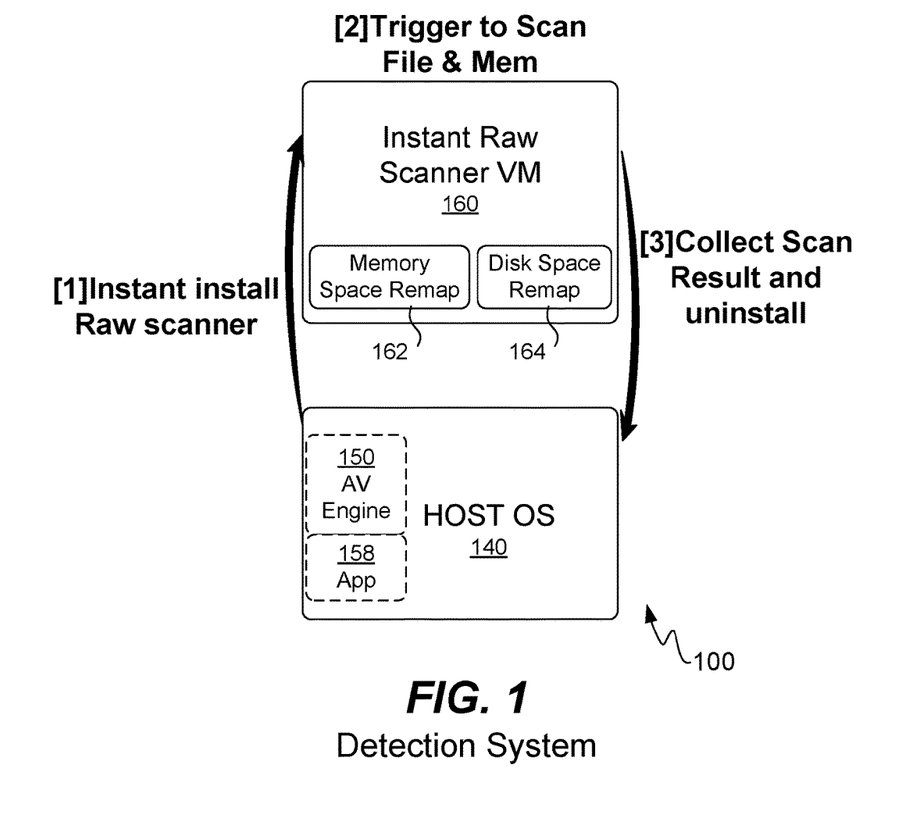
FIG. 1 is a block diagram of a detection system in accordance with an embodiment of the present invention.

FIG. 1 is a block diagram of a detection system 100 showing the architecture and overall workflow of the invention. System 100 is capable of being implemented on a variety of computers and operating systems, such as computers running a server and an end-user version of the Microsoft operating system, including versions XP SP3, 2003, Vista and 7.

In general, the detection system includes an instant raw scanner Virtual Machine (IRSVM) module 160. As is known in the art, a virtual machine is a software implementation of a machine that is able to execute programs like a physical machine. The raw scanner is "instant" in that it may be installed as a light-weight module that does not require an interrupt or reboot of the host OS. The scanning is "raw" in that the scanning process is not interfered with by evasive malware. Implementing a scanner as a virtual machine permits it to perform a scan for evasive malware on the host, which may include malware having anti-access technology, such as a Rootkit. In one embodiment the ISRVM is implemented as a disposable VM based on a host OS 140. In one embodiment the ISRVM module includes both a memory space remap module 162 and a disk space remap module 164.

An antivirus engine 150 installed on Host 140 is part of the overall detection system 100. The antivirus engine 150 may be part of a larger application layer 158. An exemplary antivirus Engine 150 is the Virus Scan API (VSAPI) of Trend Micro, Inc. VSAPI is Trend Micro's file scanning engine, a component of many Trend Micro security products. VSAPI is responsible for processing file objects and classifying them as malicious, suspected or non-malicious files.

At a high level, the operation of the invention is as follows. At some initial instant the antivirus scan engine 150 is asked to scan a specific file and memory (step 0). In step 1, the IRSVM is installed on the host OS by the antivirus scan engine 150 as a normal application on the host. In step 2, the IRSVM is triggered to scan files and memory within the host. The IRSVM acts to remap the whole disk space and the whole host memory space into its own guest space when doing the file and memory scan. This gives the IRSVM the capability to see the real host resources in regards to the memory and disk files. Note that the IRSVM is operating as a host application. Consequently, no interruption is caused to other applications and no restart is required. In step 3, the antivirus scan engine 150 collects the scan result from the IRSVM and performs any necessary uninstall of the IRSVM.

Figure 2:
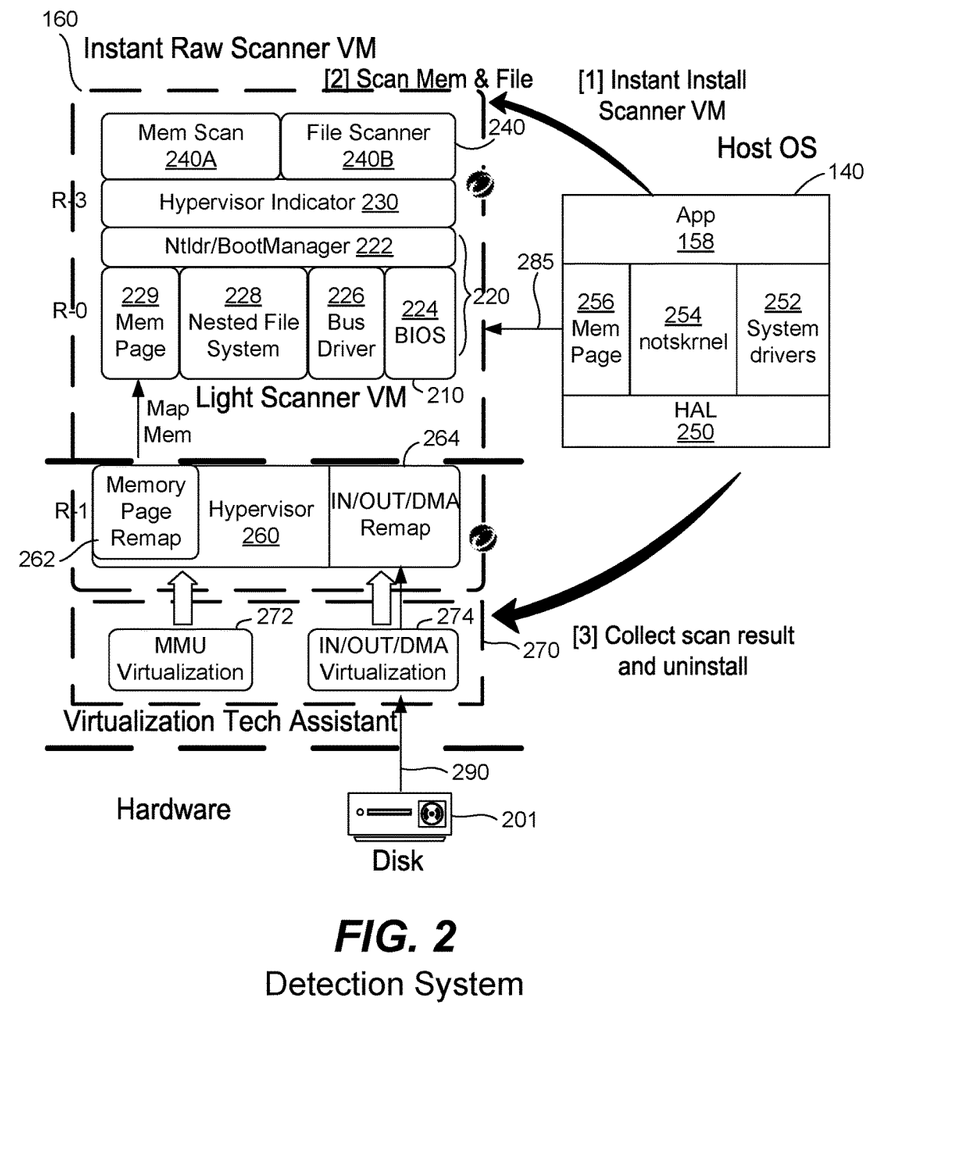
FIG. 2 illustrates in more detail a block diagram of a detection system in accordance with an embodiment of the present invention.

FIG. 2 is a more detailed block diagram of detection system 100 in accordance with an embodiment of the present invention. A more detailed view of a host OS is illustrated. In one embodiment the host OS 140 includes the antivirus application 150; a memory page module 256; an OS Kernel 258, which may be Windows compatible Kernel, such as ntoskrnl (which is short for Windows NT Operating System Kernel); system drivers 252; and a hardware abstraction layer (HAL) 250.

In one embodiment the IRSVM 160 comprises three parts. A light-weight scanner VM (LSVM) 210 is composed of infrastructure and framework of a basic operating system to implement the basic file system read and memory map. The LSVM 210 is composed of an OS infrastructure section 220, a hypervisor indicator 230, a scanner section for memory and files 240.

The OS infrastructure section 220 is mainly for CPU mode preparation, virtual management, and basic I/O function. It supports one or more platforms (e.g., Windows XP, Windows Vista). In one embodiment it includes a Ntldr/BootManager module 222 to implement the function of ntldr (NTLDR is the abbreviation of NT loader, which is the boot loader for all releases of Windows NT operating system, including Windows XP) or BootManager (the boot manager for Windows Vista and later). A BIOS (Basic Input/Output System) module 224 is provided for Input/Output (I/O) of a storage disk 201. A bus driver module 226 supports the specific system bus of devices such Atapi/SCSI, etc. A nested file system 228 is included to support major file system formats such as NTSF, FAT32, HPS, etc. The nested file system 228 may be embedded in the ntldr/bootManager.

A memory page zone 229 is provided for page management of the LSVM 210. Additionally the memory page zone 229 is used to map the physical space of the host memory to let the scanner in the LSVM 210 see the contents of the memory space of the host OS 140.

The hypervisor indicator 230 identifies the I/O request of the LSVM 210 from the host OS 140 at the instruction level. This identification is used in the hypervisor 260.

The scanner for memory and files 240 includes a memory scanner 240A and a file scanner 240B. These two portions may utilize normal memory and file scan engine techniques because they can see a file and its real content also see the contents of the virtual memory space of the host OS 140. In one embodiment the scanners 240A and 240B perform a traditional scan based on a signature pattern for heuristic analysis. The scan can thus include features for generating a report and/or providing information to remove malware, such as indicating the detection of whether a particular file is suspected of being malware. For example, the scan may be in the form of a report showing the location and type of infections in the host memory (or other locations of the host OS) and also disk infections, including the location and type of each disk infection.

The hypervisor component 260 acts to separate the memory space and I/O access from the LSVM 210 for the host OS 140. The hypervisor 260 sees and manages both the LSVM 210 and host OS 140. The hypervisor 260 is used to map the host memory space LSVM memory space for the memory scan. Additionally, the hypervisor 260 maps the whole real disk space, which contains the real file contents of the Host, to the LSVM disk space for file scanning. The hypervisor 260 may be implemented as a light-weight hypervisor that is a virtual machine (VM) on the host. In one implementation the hypervisor is implemented as a VirtualBox® for VMware® workstation.

A virtualization tech assistant component 270 provides virtualization technology support for the chipset of the hardware. This may include, for example, memory mapping unit (MMU) virtualization 272 and In/Out/DMA virtualization 274, (where DMA is a direct memory access) such as the Vt-x and Vt-d technology for an Intel® CPU.

Mapping To Memory Space

It will be understood that a variety of different ways to performing a mapping to memory space be used, depending on the implementation details. As an illustrative example, in one embodiment the mapping 285 of the memory space is implemented by a memory page remap (MPR) 262 in hypervisor 260. As an illustrative example, consider the MMU of Intel with paging in legacy mode. For this example, a register CR3 points to the physical address of the page table director, the page table director, in turn, contains page table pointer entries. Every page table is composed of series of page entries. Each page entry contains the address of a page frame.

When the hypervisor 260 indicates to map memory space of the host 140 to part of memory space of LSVM 210, the hypervisor translates and copies the page entry of the host 210, which root is HOSTOS.CR3 register table to the page entry of LSVM 210, which root is LSVM.CR3 register. After the LSVM 210 is switched, the LSVM's page table contains the information of the Host OS. Thus, the LSVM 210 sees the contents of the host memory space.

Now consider a memory share between the LSVM 210 and the host OS 140. For example, the memory share when the host OS 140 collects the scan results of the LSVM 210. The translation and copy can be executed in the reverse direction, which is the same condition as mentioned before.

Mapping To Disk Space

It will be understood that a variety of different ways to performing a mapping to disk space be used, depending on the implementation details. As an illustrative example, in one embodiment the mapping to disk space is implemented by the In/Out/DMA remap 264 in the hypervisor 260. Generally speaking, all instructions with I/O are composed of in/out and DMA (Direct Memory Access) related instructions, both of which can be virtualized by VT.

When the hypervisor 260 indicates to map the disk space of the host 140 to part of the disk space of LSVM 210, the hypervisor can trap and redirect these instructions and operations. After the I/O instructions from LSVM 210 are trapped, the hypervisor 260 identifies its source space and change the operand data from LSVM disk space to the host disk space and then executes the operation. Thus the LSVM 210 sees the contents of the disk space from the host.

Operating Example

Figure 3:
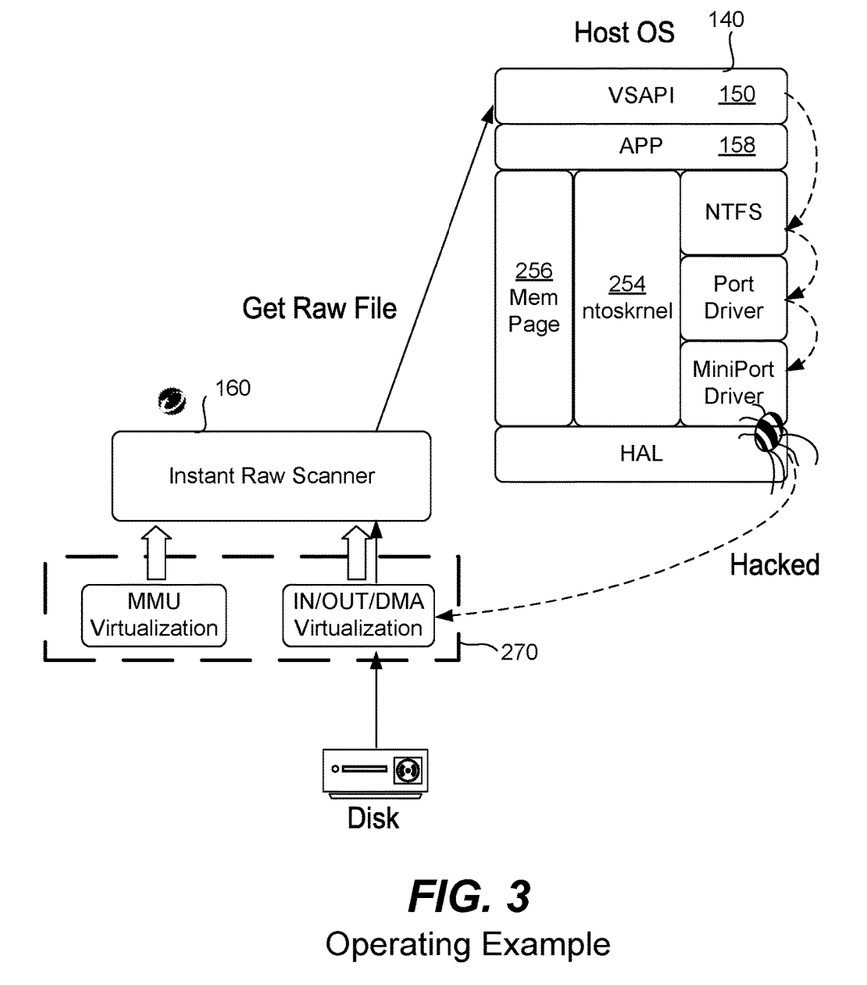
FIG. 3 illustrates a usage example in accordance with an embodiment of the present invention.

FIG. 3 illustrates one example of operation of the invention. For example, assume that the host OS 140 has been hacked. In this example the antivirus scan engine 150 within the application layer 158 may be VSAPI. If VSAP is used, VSAPI installs the instant raw scanner, which then scans the memory and files. The VSAPI then collects the scan results. As an illustrative example, suppose that some advanced malware such as variant TDL4 has infected the host OS. Additionally, suppose that the TDL4 variant is optimized by a malware author to avoid and escape an antivirus scan engine 150, such as VSAPI. For example a TDL4 variant may be designed by the malware author to escape low-level file read engines. For example, the TDL4 variant may utilize a DKOM. (Direct Kernel Object Manipulation) of the inner code of the miniport driver to hide all the pointer references to the Atapi device object. In this example, the scan engine150 can install the IRSVM on the host OS instantly, i.e., without the need for a reboot. After the time required for the scanning, the real or raw file is read from the IRSVM and transferred to the host OS antivirus engine 150. As previously discussed, the IRSVM may provide a report of detected malware to the antivirus engine 150.

As previously discussed, the scanning process is not interfered with by evasive malware. There are several ways to understand this. First, note that the virtual machine hypervisor is deployed underneath the kernel of the host OS so that a memory access or disk I/O can be intercepted even before the corresponding handler code of the host OS. This leverages VT technology by design. Another way of understanding the immunity to evasive malware is that the code of the hypervisor can exclusively execute memory and disk access freely without interference from the kernel of the host OS. Even if the malware has hijacked the kernel of the host OS and tries to hide its existence in memory and disk by intercepting the execution path of the host OS kernel code, the virtual machine hypervisor can always "see" and even get rid of the real or "raw" memory and disk infection. In this way, "raw" memory and disk scan are implemented.

For example, suppose the malicious code and its dependent running environment are confined to Ring3 and Ring0 of a CPU segment privilege, which are higher than the level of the LRSVM hypervisor (i.e. Ring-1). In this example any memory and disk requested access can be intercepted by the hypervisor. When the hypervisor code is running in Ring-1, its execution cannot be interrupted or modified by code in Ring3 or Ring0 by the design of the VT technology. In this way, the hypervisor can exclusively access the real or raw memory and disk of guest space to find out the real infection of malware so that malicious interference, even from the kernel of the host OS, takes no effect on the hypervisor.

In contrast, a traditional kernel mode scan would not find out the real disk file containing evasive malware, which is hidden via the anti-access technology of evasive malware. Additionally, a traditional approach of using a second OS, such as a USB fix, would annoy the user by forcing an interrupt. Moreover, if this host OS is a critical web server it would not be permitted to reboot.

Flow Diagrams

Figure 4:
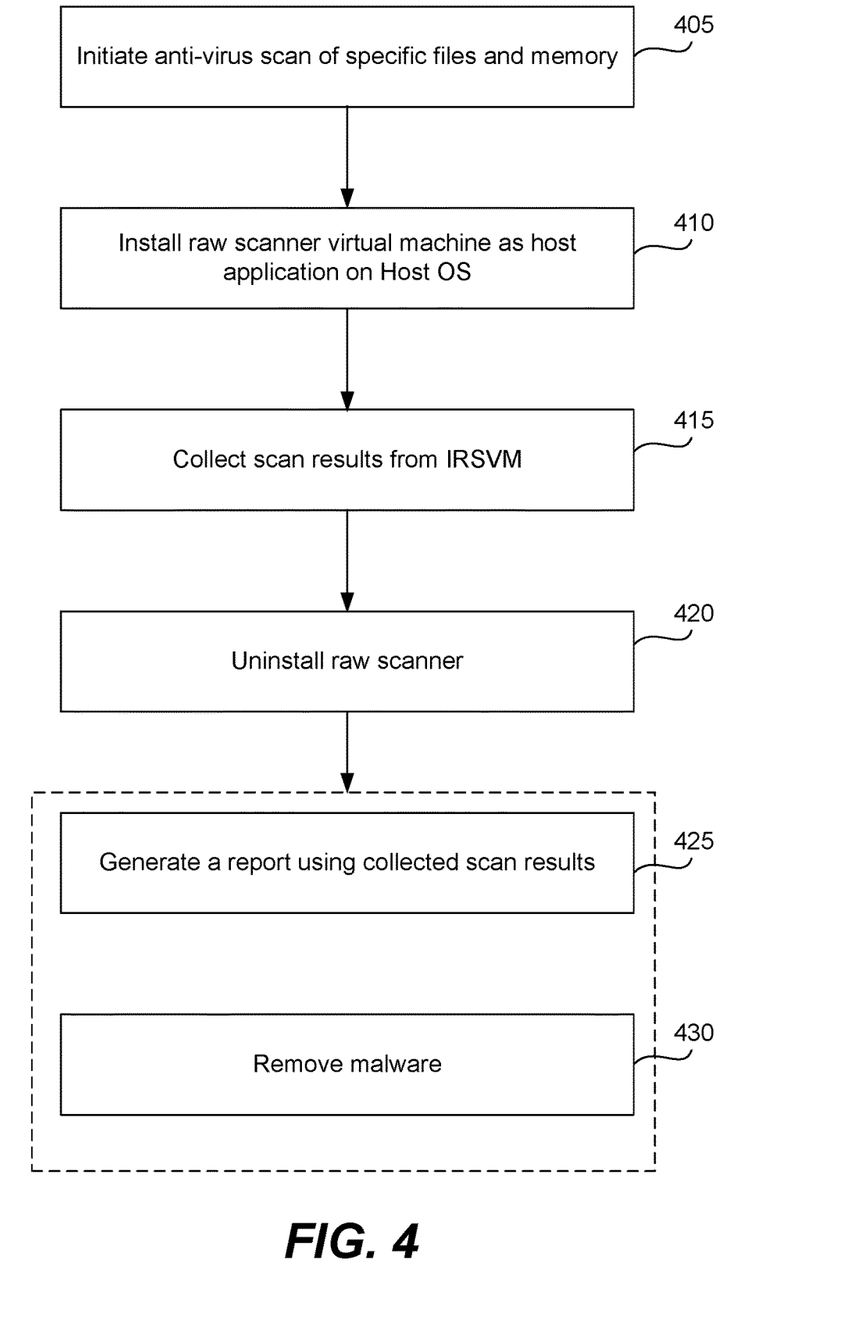
FIG. 4 is a flow chart of a method of malware detection in accordance with an embodiment of the present invention.

FIG. 4 is a flow diagram describing one embodiment by which a host computer detects malicious behavior of malware from the perspective of the antivirus software. In step 405, the antivirus engine initiates an antivirus scan. In step 410, the raw scanner virtual machine is installed as a host application. In step 415 the antivirus engine collects the raw scan results from the raw scanner virtual machine. In step 420, the raw scanner is uninstalled if necessary. The raw scan results may, for example, include a listing of infections in the host memory, disk, and any other network ports scanned. The antivirus engine may utilize the raw scan results as an aid to generating a report 425 and/or to provide information to remove malware 430. It will be understood that raw scanner may be uninstalled after the scan results are collected. Alternatively, in other implementations the raw scanner may be uninstalled at a later time, such as after confirming that additional raw scans will not be needed or after a pre-set delay.

Figure 5:
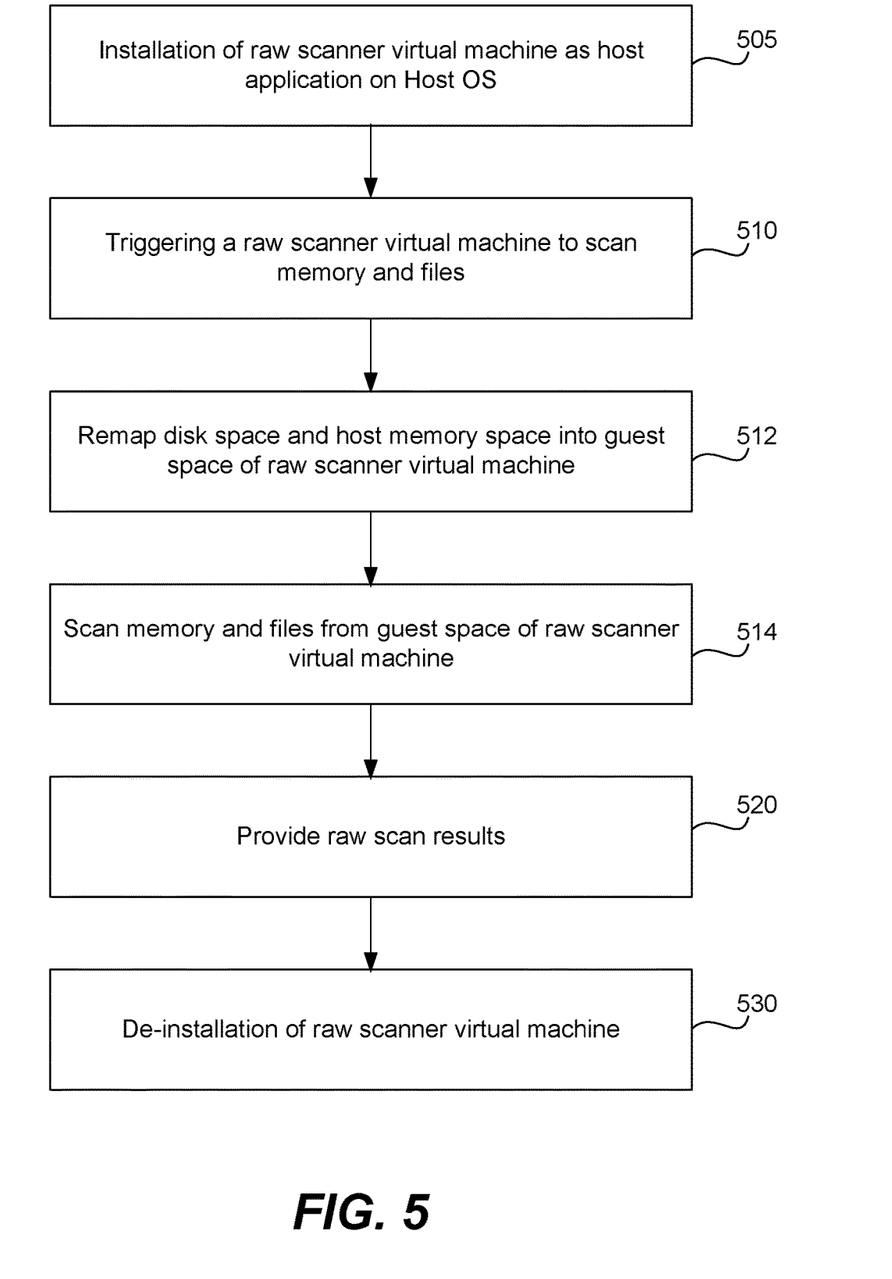
FIG. 5 is a flow chart of a method of malware detection in accordance with an embodiment of the present invention.

FIG. 5 is a flow diagram from the perspective of the raw scanner. The raw scanner virtual machine is installed as a host application in step 505. The raw scanner virtual machine is triggered to scan memory and files. In one implementation this includes a step 512 of remapping of the host memory space and the host disk space into the guest space of the raw scanner virtual machine. In step 514, the scanning of memory and filed may be performed from the guest space of the raw scanner virtual machine. In step 520 the raw scan results are provided and in step 530 the raw scanner is de-installed.

Figure 6:
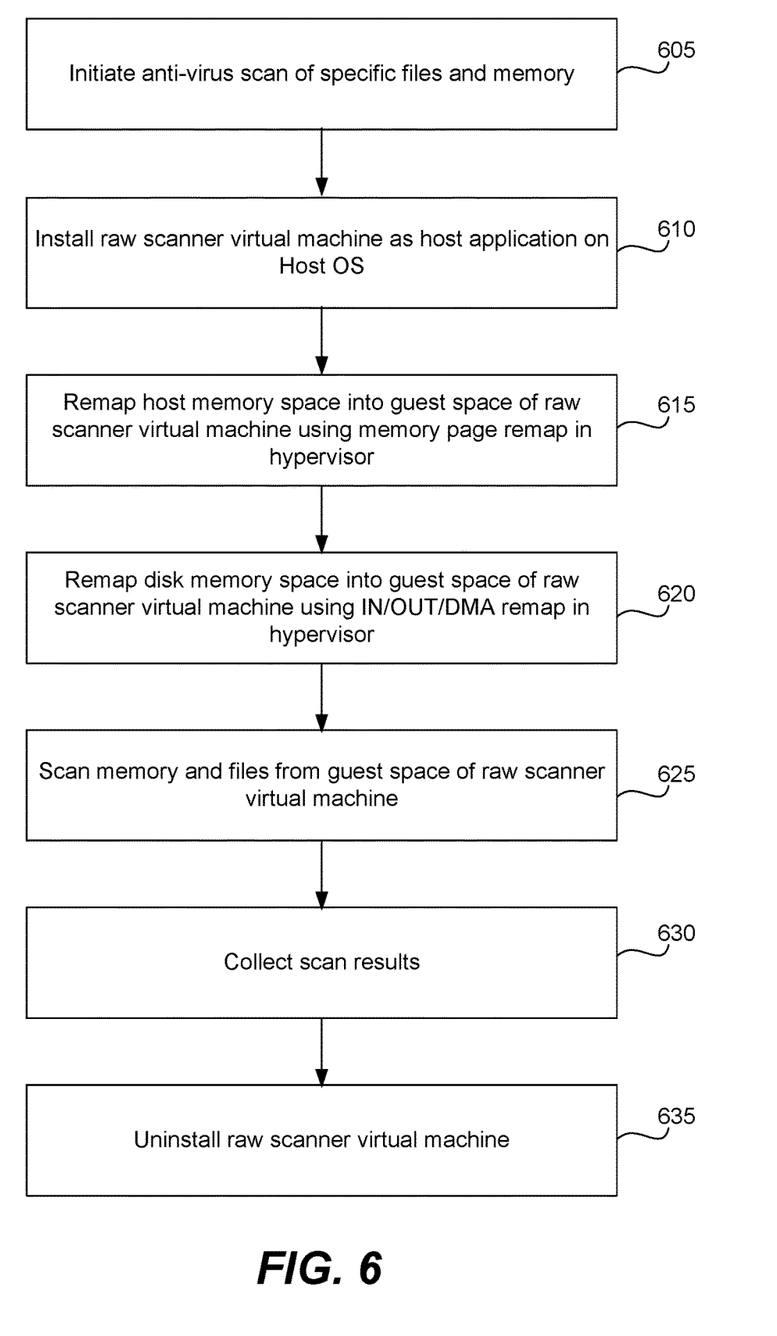
FIG. 6 is a flow chart of a method of malware detection in accordance with an embodiment of the present invention.

FIG. 6 is a flow diagram showing in more details versus steps of a process in accordance with an embodiment of the present invention. In step 605 an antivirus scan is initiated of specific files and memory. In step 610, the raw scanner virtual machine is installed. In step 615, the host memory space is remapped into the guest space of the raw scanner virtual machine using the memory page remap of the hypervisor. In step 620, the disk memory space is remapped into the guest space of the raw scanner virtual machine using the IN/Out/DMA remap of the hypervisor. In step 625, the raw scanner virtual machine scans the memory and files from the guest space. In step 630 the scan results are collected. In step 635 the raw scanner virtual machine is uninstalled.

Computer System Embodiment

Figure 7A:
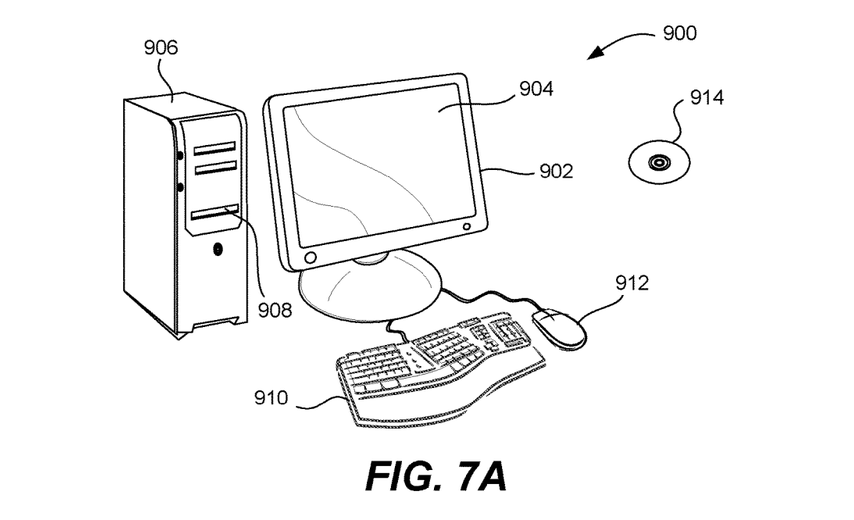
FIGS. 7A and 7B illustrate a computer system suitable for implementing embodiments of the present invention.
Figure 7B:
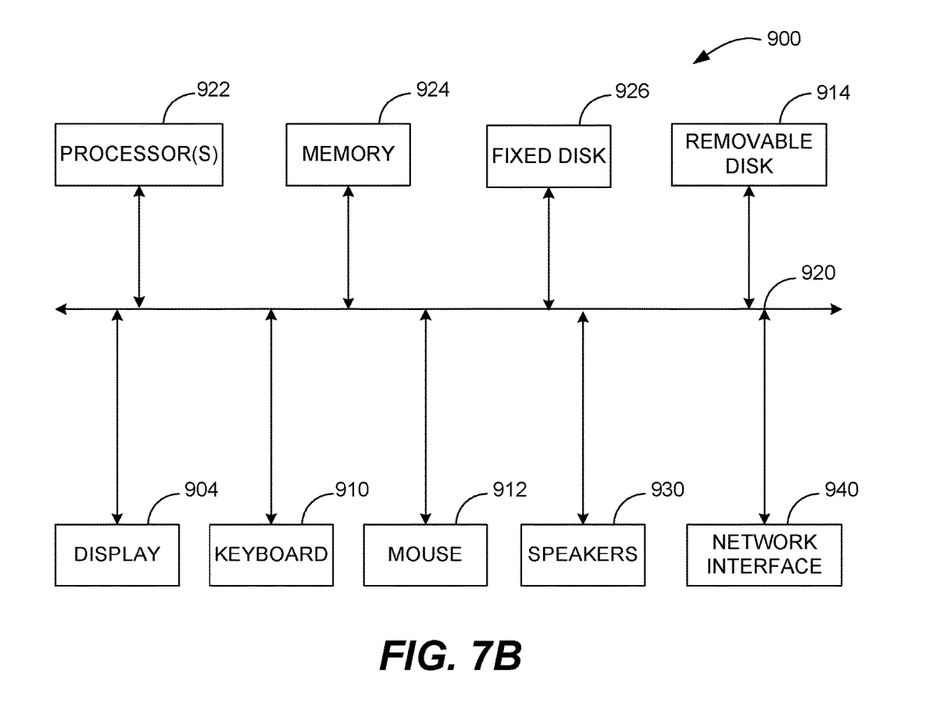

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method comprising:
operating an antivirus program on an application layer of a host operating system of a host computer;
installing, by the antivirus program, a disposable virtual machine as a host application on the host operating system of the host computer, the virtual machine including a malware scanner, wherein the malware scanner is a light-weight scanner having a memory scanner and a file scanner;
remapping, by the virtual machine, a disk memory space and a host memory space into a guest memory space of the virtual machine, wherein the remapping includes utilizing a memory page remap in a virtual machine hypervisor using an In/Out/DMA remap in the virtual machine hypervisor;
performing, from the virtual machine, a scan of files and memory of the host computer for evasive malware on the host computer, wherein the scan of files and memory is performed from the guest memory space;
providing scan results, from the virtual machine, to the anti-vims program operating on the host operating system wherein the scan includes performing a signature pattern match and heuristic analysis;
determining whether additional scans are required, and in response to determining that no additional scans are required, uninstalling, by the antivirus program, the virtual machine;
detecting evasive malware having anti-access technology based on the scan results collected from the virtual machine;
wherein the antivirus program installs and uninstalls the virtual machine and the scan results are provided to the anti-virus program, by the virtual machine, without requiring an interrupt or a restart of the host operating system and without requiring a second operating system;
wherein the hypervisor of the virtual machine is deployed underneath the kernel of the host operating system so that the hypervisor executes memory and disk access without interference from the kernel of the host operating system so that the host operating system is protected from malware having anti-access technology hijacking the kernel of the host operating system.

2. A method, said method comprising:
operating an antivirus program on an application layer of a host operating system of a host computer;
installing, by the antivirus program, a disposable virtual machine as a host application on the host operating system of the host computer, wherein a malware scanner of the virtual machine has a memory scanner and a file scanner wherein the virtual machine operates a virtual technology environment that includes a hypervisor;
mapping memory and files of the computer system to a guest space of the virtual machine, wherein the mapping comprises mapping of a host memory space utilizing a memory page remap in the hypervisor and wherein the mapping comprises mapping of a disk memory space in the hypervisor;
performing, from the guest space of the virtual machine, a scan of files and memory of the host computer for evasive malware; and
providing scan results from the virtual machine to an antivirus program operating on the host operating system; and
detecting evasive malware having anti-access technology based on the scan results collected from the virtual machine;
determining whether additional scans are required, and in response to determining that no additional scans are required, uninstalling, by the antivirus program, the virtual machine; wherein the anti-virus program installs and uninstalls the virtual machine; wherein the scan results are provided to the anti-virus program, by the virtual machine, without requiring an interrupt or a restart of the host operating system and without requiring a second operating system;
wherein a hypervisor of the virtual machine is deployed underneath the kernel of the host operating system so that the hypervisor executes memory and disk access without interference from the kernel of the host operating system so that the host operating system is protected from malware having anti-access technology hijacking the kernel of the host operating system.

* * * * *